United States Patent [19]
Pakosh

[11] Patent Number: 4,492,237
[45] Date of Patent: Jan. 8, 1985

[54] ROTARY COMBINE
[75] Inventor: Daniel Pakosh, Winnipeg, Canada
[73] Assignee: Versatile Cornat Corporation, Vancouver, Canada
[21] Appl. No.: 178,014
[22] Filed: Aug. 13, 1980
[30] Foreign Application Priority Data Aug. 13, 1979 [CA] Canada .................................. 333765

[51] Int. Cl.³ .............................................. A01F 7/04
[52] U.S. Cl. .................................. 130/27 R; 56/146; 130/27 Q
[58] Field of Search ............ 56/14.6, 27 AB, DIG. 2; 130/27 T, 27 HA, 27 Q, 27 F, 27 H, 27 R

[56] References Cited
U.S. PATENT DOCUMENTS

| 1,386,298 | 8/1921 | Winslow | 130/27 Q |
| 2,129,452 | 9/1938 | Van Sickle | 130/27 Q |
| 3,296,782 | 1/1967 | Mark et al. | 130/27 Q |
| 3,430,633 | 4/1969 | Mark | 130/27 R |
| 3,623,302 | 11/1971 | Schmitt | 130/27 T |
| 3,994,303 | 11/1976 | Hill | 130/27 T |
| 4,117,849 | 10/1978 | Pakosh | 130/27 Q |
| 4,270,550 | 6/1981 | da Silva | 56/14.6 |

FOREIGN PATENT DOCUMENTS 405214 4/1924 Fed. Rep. of Germany .... 130/27 T

Primary Examiner—Gene Mancene
Assistant Examiner—John Weiss
Attorney, Agent, or Firm—Wenderoth, Lind & Ponack

[57] ABSTRACT

A rotary combine and a method for threshing and separating crop are disclosed which utilize separate rotary threshing and separating assemblies. Both assemblies are in the form of cylinders and the separating assembly is located transversely and rearwardly of the threshing assembly. Crop is introduced along a plane substantially tangential to the lower entrance portion of the threshing assembly, conveyed by guide vanes to an end portion of the threshing assembly, passed from the threshing assembly axially into the separating assembly and conveyed by a series of further guide vanes to the rearward portion of the separating assembly where the crop residue exits from the combine.

16 Claims, 4 Drawing Figures

ROTARY COMBINE

This application relates to a new and improved rotary combine harvester.

BACKGROUND OF THE INVENTION

In conventional combines, crop is threshed and separated by the use, in combination, of a threshing cylinder, a beater, straw walkers and a cleaner. Crop typically passes from a gathering mechanism through a table auger and a feeder elevator to the entrance portion of the threshing cylinder which is mounted transversely to the longitudinal frame axis of the combine. The threshing cylinder comprises a rotor rotatable within a concave and has metal rasp bars attached thereto to thresh the crop as it passes between the rasp bars and the concave of the threshing cylinder. A beater is positioned rearwardly of the threshing cylinder and its axis is substantially parallel to the axis of the threshing assembly. It further removes many of the free kernels that have not yet been separated from the crop in the threshing cylinder and also directs the crop to the straw walkers. The straw walkers convey the crop residue to the rearward and exit portions of the combine while removing free kernels and grain heads which have not been previously separated from the crop. A cleaner is located below the straw walkers and comprises a chaffer located in a higher position and a sieve located beneath the chaffer. The chaffer allows grain to drop therethrough and is adapted to remove the chaff because of its lighter weight and the effect of air flow. The chaffer also provides for returning grain heads to the threshing cylinder for rethreshing. The sieve allows separated free kernels to pass therethrough and be collected by a clean grain auger which conveys the grain to an elevator which, in turn, transports the grain to a grain storage tank.

To remove the grain from the grain tank, a is used which is located within an unloading chute located on one side of the combine. The unloading chute allows grain to be moved from the grain tank to an unloading or receiving vehicle positioned on the side of the combine where the exit portion of the unloading chute is located.

There are improvements possible in the conventional system just described. For example, the concave of the threshing cylinder surrounds it for only a relatively small portion of the more than 360° which could be utilized to thresh and separate the crop. This is inefficient.

Similarly, as the quantity of material passing through a conventional combine is increased, there is a loss of efficiency in the straw walkers which increases disproportionately to the increased quantity of crop entering the combine. Free kernels and grain heads escape from the combine without being separated from the crop. This is clearly undesirable.

Manufacturers have attempted to increase the efficiency of grain removal from crop by utilizing "rotary" combines, so called because the crop circles the threshing and separating assembly through one or more revolutions rather than passing over only a portion thereof. Because of the increase in threshing and separating efficiency in rotary combines, the straw walkers may be eliminated. Nevertheless, many improvements are possible in present rotary combines.

For example, although the concave or grate extends over 360° of the threshing cylinder which increases the separation efficiency of the combine, it also increases the quantity of very short and light pieces. This makes baling difficult Similarly, present rotary designs usually require the crop to be introduced axially to the threshing and separating assembly. The incoming crop, therefore, must necessarily turn through an angle which will allow the crop flow to match the angle of the helical guide vanes which convey the crop through the assembly. This requirement may cause unnecessary congestion at the entrance area of the assembly which limits the combine feed rate. This, in turn, adversely affects combine capacity.

Yet a further problem relates to the feed path of crop. Present rotary combine designs usually call for the crop to travel a single path through the combine. In heavy crop conditions, this may limit the feed rate of crop material, particularly at the entrance areas, which again adversely affects combine capacity.

In conventional and rotary combines the unloading chute is located on one side of the combine. There may be no or limited rotational adjustment for the unloading chute available to the operator and, at any rate, the combine must be unloaded on one side only. In normal crop combining applications, the grain receiving vehicle necessarily drives through the swath causing undesirable crop damage. Similarly, the unloading flexibility of the operator may be limited by creating unnecessary vehicle movement when two trucks are deployed.

More recently, some of these problems were overcome or substantially improved by the rotary combine of our U.S. Pat. No. 4,117,849 (Pakosh). In the combine there disclosed, separate threshing and separator assemblies were utilized for greater efficiency. Crop was introduced along a plane substantially tangential to the entrance portion of the threshing cylinder which enabled the combine to process a greater amount of crop because the angle of the helical guide vanes located on the upper half of the casing was more closely aligned with the incoming angle of the crop thereby avoiding subjecting the crop to a large "turn" angle. A further improvement disclosed there was the introduction of crop at the central portion of the threshing assembly with the helical guide vanes on the casing acting to split the crop upon its introduction to the threshing cylinder. This increased the capacity of the combine because dividing the crop allowed the machine to handle more crop more efficiently in the threshing assembly.

SUMMARY OF THE INVENTION

According to one aspect of the invention, there is disclosed a rotary combine for threshing and separating crop comprising crop feed means, a large capacity rotary threshing assembly for carrying out substantially only threshing mounted substantially transversely to the longitudinal axis of said conbine, said threshing assembly comprising a substantially cylindrical rotor, a threshing cap around the upper periphery of said rotor and a concave around the lower periphery of said rotor and means for causing crop being threshed to move in a direction parallel to the axis of said rotor from the center of said threshing assembly to the ends thereof, entrance means midway of the length of said threshing assembly operable to receive said crop from said crop feed means, threshing guide means in said threshing assembly to convey crop to an end portion thereof, two rotary separator assemblies mounted substantially transversely to said threshing assembly, one at each end of said threshing assembly for carrying out substantially only grain and straw separation and having an entrance area adjacent said end portion of said threshing assembly, passage means in said threshing assembly at said end portion to allow passage of said crop from said end portion to the entrance area of said separator assembly, and separating guide means in said separator assembly to convey said crop rearwardly therein whereby the separator assemblies can be made sufficiently long to accommodate the quantity of crop being threshed in said threshing assembly and the width and length of the combine can be kept to a minimum for a given capacity thresher. assembly and adjacent each respective end portion thereof, separating said crop while conveying it rearwardly in said separator assemblies and discharging crop residue from said combine, whereby the separator assemblies can be made sufficiently long so that the separating step is carried out for a long enough period of time to substantially completely separate the crop threshold in the threshing assembly.

In accordance with yet a further aspect of the invention, there is disclosed an unloading chute for a combine, said unloading chute having an entrance portion located adjacent the grain tank and an exit portion located outside the grain tank, said exit portion adapted to be moved from one side of the longitudinal axis of said combine to the opposite side whereby a loading vehicle may receive the grain from said combine from either of said two sides.

In accordance with yet a further aspect of the invention, there is disclosed an atmospheric cleaning device for a combine comprising:
 (a) a separator assembly;
 (b) an opening in the input end of said separator assembly; and
 (c) a plenum chamber communicating with the input end of said separator assembly and extending to the forward portion of said combine, whereby under operation of said separating assembly a suction is created in said plenum chamber to remove dust and/or debris from the atmosphere at said forward portion of said combine.

BRIEF DESCRIPTION OF THE SEVERAL VIEWS OF THE DRAWING

The invention will now be described, by way of example only, with reference to accompanying drawings in which.

DESCRIPTION OF SPECIFIC EMBODIMENT

Figure 1:
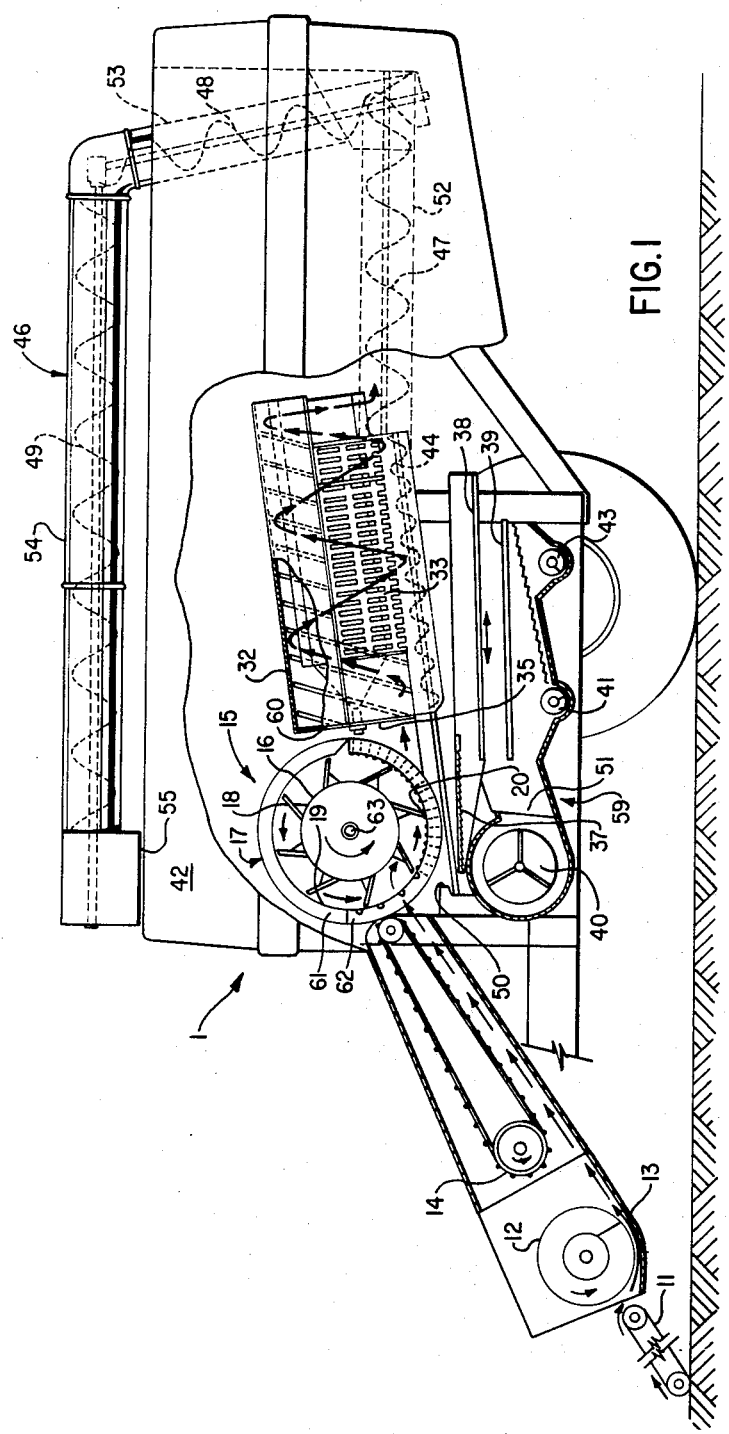
FIG. 1 is a side elevation of the rotary combine harvester.

Referring now to FIG. 1, a rotary combine harvester is shown generally at 1. It comprises a threshing unit shown generally at 15 and a pair of separator units shown generally at 27,28. A crop pickup 11 is located forward of the combine.

A table auger 12 located in the table 13 and a feeder elevator 14, in turn, feed crop to the entrance area of the combine adjacent the threshing unit 15. The threshing unit 15 is positioned with its longitudinal axis transverse to the longitudinal axis of the combine 1 and comprises a rotor 16 and a cylindrical perphery 17 surrounding the rotor. The rotor 16 has flexible blades 18 mounted thereon, which blades 18 are connected by fasteners (not shown) to the rotor 16. The cylindrical periphery 17 comprises a threshing cap 19 on the upper half of the cylinder periphery 17 and a concave bottom portion 20 of conventional design on the lower half of the periphery 17.

Figure 3:
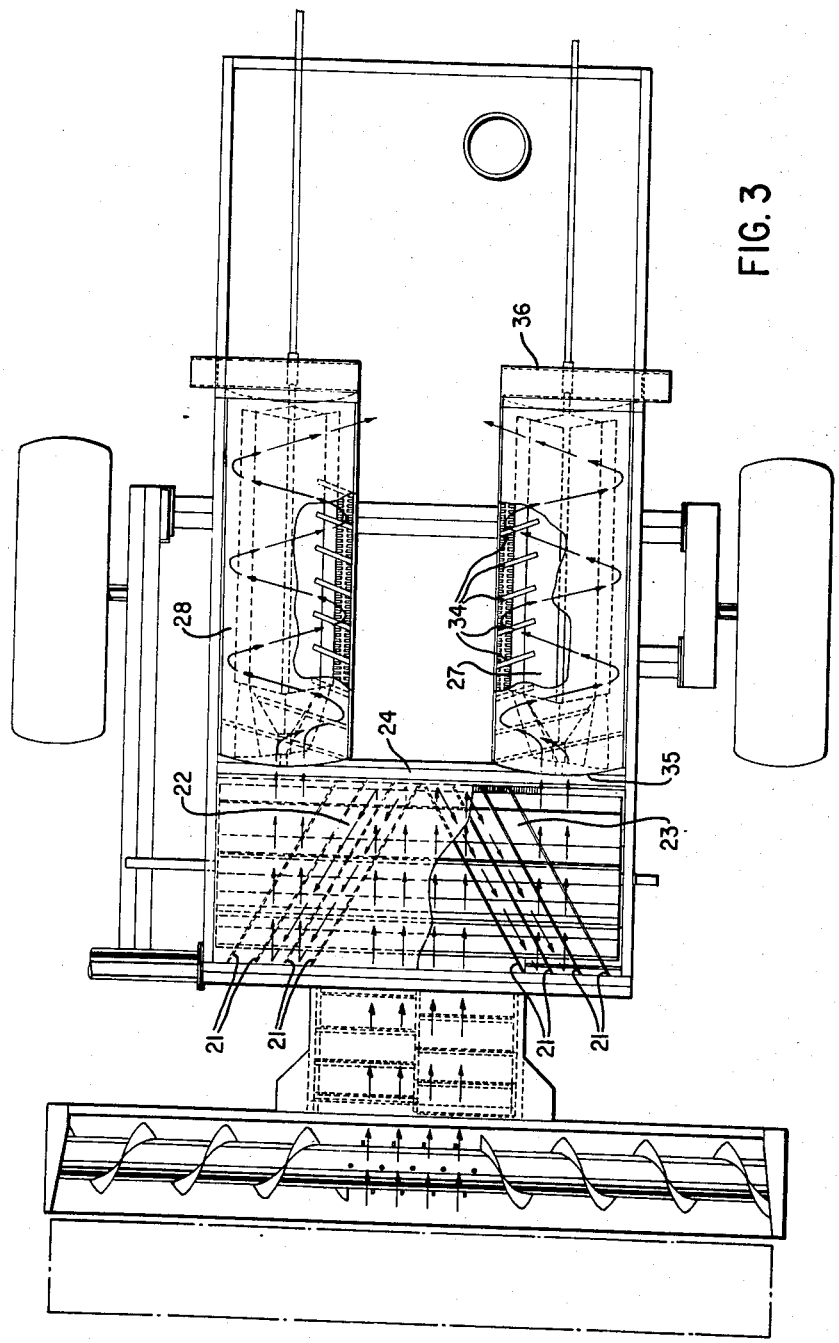
FIG. 3 is a cutaway plan view of the combine of FIG. 1.

Helical guide vanes 21 are mounted within the threshing unit 15 on the upper portion of the cylinder periphery 17 (FIG. 3). The guide vanes are divided into right and left portions 22, 23 respectively, each vane of which begins at the rearward portion 24 of the threshing unit 15 inwardly of the entrance area and extend to the left and right respective end portions of the threshing unit 15.

First and second separator units 27,28, respectively, are located with their longitudinal axes transverse to the longitudinal axis of the threshing unit 15. The separator units 27, 28 are substantially identical and, accordingly, only one of the separating units will be described. A separating rotor 29 (FIG. 2) is mounted for rotation within the periphery 30 of the separator unit 27 and metal plates or blades 31 are mounted on the separating rotor 29. The periphery 30 of the separator unit 27 is formed of a solid cylindrical plate 32 over the upper half portion of the cylinder and a perforated grate 33 over the lower portion. Helical guide vanes 34 (FIG. 3) are mounted on the upper portion of the periphery 30 and extend from the entrance area 35 of the separating unit to the exit area 36.

The entrance area 35 of the separating unit has an open area below its longitudinal axis and a plate 60 (FIG. 1) mounted above the axis. A further opening (not shown) is provided in the plate 60. This opening communicates with plenum 61 which extends from the entrance area 35 of the separating assembly to the entrance area 62 of the threshing unit 15. The plenum 61 is open at the entrance area 62 in the vicinity of elevator 14 and, at its rearward portion, of plenum 61 communicates directly with the opening in plate 60. An arrangement for controlling the size of the opening in plate 60 such as a mechanically or hydraulically operated sliding shutter valve may be provided.

Augers 44, 45, are mounted below separating unit 27. The cleaning section generally denoted 59 includes chaffer 38 which is located below the rearward portion of grain pan 37. Chaffer 38 is perforated with relatively large openings. A sieve 39 with relatively smaller openings is mounted below the chaffer 38.

A forced air supply 40 is mounted below grain pan 37 to disperse one stream of air over the grain pan 37 and another stream beneath the chaffer 38 and sieve 39. A centrifugal fan is provided to rotate within the housing of the forced air supply 40 and two openings are provided to allow the necessary air to escape. The first opening 51 allows air to exit below chaffer 38 and sieve 39. The second opening 50 allows air to exit over the grain pan 37.

Clean grain auger 41 is located in the lower portion of the cleaning section. Return auger 43 is also located in the lower portion of the cleaning section 59 and rearwardly of clean grain auger 41.

Figure 2:
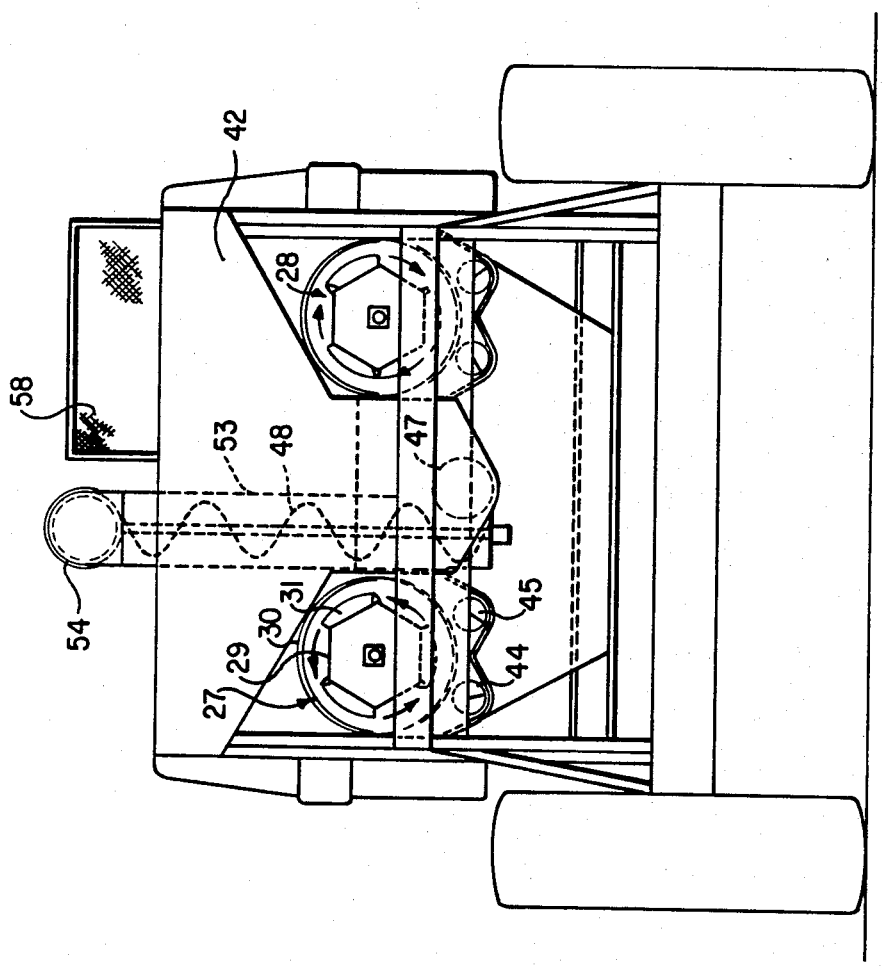
FIG. 2 is a rear view of the combine of FIG. 1.
Figure 4:
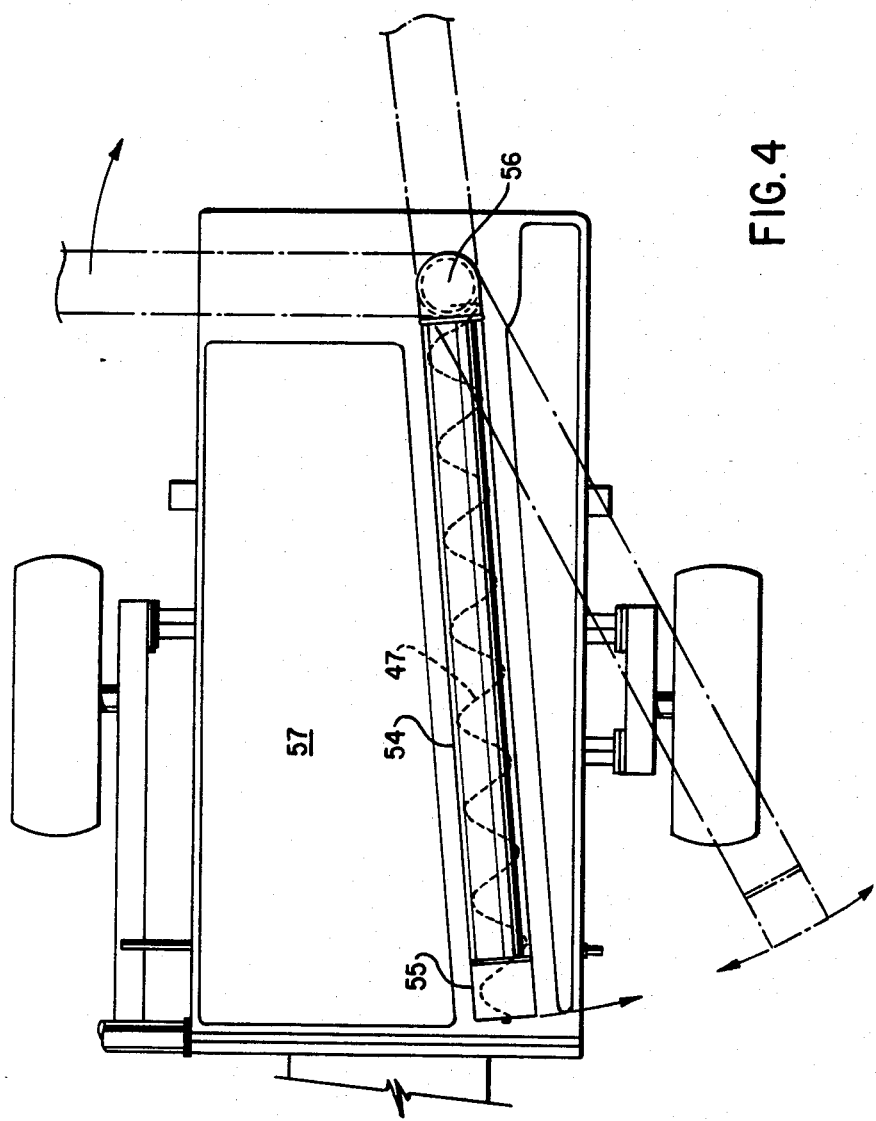
FIG. 4 is a plan view of the combine of FIG. 1.

The grain tank generally denoted 42 is mounted in the upper portion of the combine 1 and extends over and between the separator units 27, 28 and the threshing unit 15 as more clearly seen in FIG. 2. A discharge or unloading chute generally denoted 46 has a first section 52 which extends in the bottom of the grain tank 42 rearwardly to the junction of the first section 52 and a second section 53. The second section 53 extends upwardly and forwardly and terminates at the junction of second section 53 third section 54. Third section 54 extends forwardly and terminates in a grain exit means 55. Within each of the three sections, respectively, are grain handling augers 47, 48, 49, which convey the grain from the grain tank 42 to the grain exit means 55. Suitable gear drives are provided to rotate the augers under power and to allow for rotation of the third section 54 of the discharge chute about the axis 56 (FIG. 4). Third section 54 is rotatable through an angle of approximately 270° as seen in FIG. 4. In the area generally denoted 57, a screen 58 is provided about the top of the grain tank 42 to allow visual inspection by the operator of the quantity of grain in the grain tank 42.

OPERATION

In operation, swathed crop is received by crop pickup 11 and enters table auger 12 where it is conveyed from both sides towards the central portion and into feeder elevator 14. Feeder elevator 14 conveys the crop, in turn, to the central entrance area 62 of threshing unit 15 along a plane substantially parallel to the longitudinal axis of the rotor 16 of the threshing unit 15 and such that the crop smoothly enters the threshing unit 15 below its axis 63.

As the crop enters the threshing unit 15, the crop is subject to the initial threshing action of the flexible blades 18 over approximately 100° before it is divided by the guide vanes 22, 23 and conveyed to each side of the threshing unit 15. As the crop moves to the sides of threshing unit 15, it continues to be subjected to the flailing action of the flexible blades 18. A substantial portion of grain is removed from the crop in the threshing unit 15 and these free grain kernels pass through the concave 20 together with grain heads and some chaff onto the oscillating grain pan 37.

The threshed crop then passes from the exit areas of the threshing unit 15 axially into the separators 27, 28 below the centre positions. Since the action of both separators is substantially identical, only one will be described. The crop axially enters the entrance area 35 of separator 27 (FIG. 3) and is conveyed in a layer along the periphery 30 (FIG. 2) by the combined action of the helical guide vanes 34 and the rotor 31. Grain remaining in the crop and, as well, grain heads and some chaff will pass through the grate 33 and fall downwardly into the augers 44, 45. Augers 44, 45 convey the grain, grain heads and any chaff which still remains to the forward portion beneath the separator where it drops towards grain pan 37. Remaining material will exit from the separator 27 and be deposited on the ground.

As the grain, grain heads and chaff fall downwardly from, respectively, the concave 20 of the thresher and the augers 44, 45 of the separating units, they come under the influence of the cleaner generally denoted 59. Air exits at opening 50 to pass over the grain pan 37 and from opening 51 to pass through chaffer 38 and sieve 39, respectively. The action of the air from the forced air supply 40 blows the lighter chaff out the exit of the combine 1 while allowing the grain and grain heads to pass to the clean grain auger 41 and return auger 43, respectively, through chaffer 38 and sieve 39. An elevator (not shown) conveys the grain from the exit of clean grain auger 41 to the grain tank 42. Grain heads which pass to return auger 43 are conveyed to a rethresher (not shown) after which they are again blown into separator unit 27.

The separators 27, 28 also provide a suction for the plenum 61. The suction exists entrance at the area 62 of the threshing unit and acts to reduce the chaff and other airborne debris by removing it from the atmosphere immediately forward of the threshing unit.

When the operator desires to unload the grain tank 42, he activates the augers 47, 48, 49 and directs the grain exit means 55 by hydraulic means or otherwise, to either side of the combine, as the case may be. Grain will then pass from the grain tank 42 to a truck or other transportation device which receives the unloaded grain.

Accordingly, there has been described a rotary combine which is illustrative of one embodiment of the invention. The description should not be construed as limiting the invention as many changes may be made without departing from the scope of the accompanying claims.

The embodiments of the invention in which an exclusive property or privilege is claimed are defined as follows:

1. A rotary combine for threshing and separating crop comprising crop feed means, a large capacity rotary threshing assembly for carrying out substantially only threshing mounted substantially transversely to the longitudinally axis of said combine, said threshing assembly comprising a substantially cylindrical rotor, a threshing cap around the upper periphery of said rotor and a concave around the lower periphery of said rotor and means for causing crop being threshed to move in a direction parallel to the axis of said rotor from the center of said threshing assembly to the ends thereof, entrance means midway of the length of said threshing assembly operable to receive said crop from said crop feed means, threshing guide means in said threshing assembly to convey crop to an end portion thereof, two rotary separator assemblies mounted substantially transversely to said threshing assembly, one at each end of said threshing assembly, for carrying out substantially only grain and straw separation and having an entrance area adjacent said end portion of said threshing assembly, passage means in said threshing assembly at said end portion to allow passage of said crop from said end portion to the entrance area of said separator assembly, and separating guide means in said separator assembly to convey said crop rearwardly therein, whereby the separator assemblies can be made sufficiently long to accommodate the quantity of crop being threshed in said threshing assembly and the width and length of the combine can be kept to a minimum for a given capacity thresher.

2. A rotary combine as in claim 1 wherein said threshing guide means comprises helical guide vanes extending from said central portion outwardly to each respective end portion.

3. A rotary combine as in claim 2 wherein said guide vanes are mounted on the upper portion of said cylinder.

4. A rotary combine for threshing and separating crop material, said combine comprising crop feed means, a large capacity rotary threshing assembly operable to receive crop from said crop feed means at a central entrance portion, said threshing assembly comprising a substantially cylindrical rotor, a threshing cap around the upper periphery of said rotor and a concave around the lower periphery of said rotor, two respective rotary separator assemblies, said separator assemblies being located at respective end portions of said threshing assembly and mounted so as to extend substantially transversely and rearwardly thereto and having entrance areas adjacent the end portions of said threshing assembly, guide means in said threshing assembly operable to divide said crop and convey portions thereof to each of said end portions, exit means in said thresher assembly at said end portions located adjacent entrance areas of each of said separator assemblies whereby crop is adapted to pass from said exit areas of said thresher assembly to said entrance areas of said separator assemblies and the separator assemblies can be made sufficiently long to accommodate the quantity of crop being threshed in said threshing assembly and the width and length of the combine can be kept to a minimum for a given capacity thresher.

5. A rotary combine as in claim 4 wherein said thresher assembly comprises an upper and a lower cylindrical portion surrounding said rotor, said guide vanes being vanes mounted on the upper portion of said cylinder, said guide vanes acting to divide and convey crop from said entrance area of said threshing assembly to each respective end portion.

6. A rotary combine as in claim 5 wherein said vanes are helical.

7. A rotary combine as in claim 4 wherein each respective separator assembly comprises a rotor and guide means, said rotor and guide means acting to separate said crop and guide it rearwardly in each respective separator assembly.

8. A rotary combine for threshing and separating crop material comprising crop feed means, a large capacity rotary threshing assembly mounted transversely to the longitudinal axis of said combine, said threshing assembly comprising a substantially cylindrical rotor, a threshing cap around the upper periphery of said rotor and a concave around the lower periphery of said rotor, said threshing assembly having an entrance area located in its central portion operable to receive crop from said crop feed means, helical guide vanes located in said threshing assembly and operable to divide said crop at said entrance area and convey it to respective end portions of said threshing assembly, exit areas adjacent each respective end portion of said threshing assembly, and two rotary separator assemblies mounted substantially parallel and extending rearwardly from each end portion of said threshing assembly, each separator assembly having an entrance area located adjacent a corresponding exit area of said threshing assembly and operable to receive crop therefrom, whereby the separator assemblies can be made sufficiently long to accommodate the quantity of crop being threshed in said threshing assembly and the width and length of the combine can be kept to a minimum for a given capacity thresher.

9. A rotary combine as in claim 8 wherein each of said separator assemblies includes guide vanes and a rotor, said guide vanes acting to move said crop rearwardly in said separator assemblies.

10. A method of threshing and separating crop material comprising the steps of receiving crop through an entrance area in a rotary threshing assembly mounted transverse to the longitudinal axis of said combine, said entrance area being located in the central portion of said threshing assembly, dividing said crop at said central portion and conveying it while threshing said crop to each respective end portion of said threshing assembly by helical guide vanes located therein, passing said crop from exit means located in each respective end portion to entrance areas in respective rotary separator assemblies mounted substantially transverse to said threshing assembly and adjacent each respective end portion thereof, separating said crop while conveying it rearwardly in said separator assemblies and discharging said crop residue from said combine.

11. The method of claim 10 wherein said threshing assembly has a cylindrical casing, and said crop is received by said threshing assembly substantially tangential to the cylindrical casing of said threshing assembly at said entrance area.

12. The method of claim 11 wherein said crop is divided by the action of said helical guide vanes in said threshing assembly.

13. The method of claim 12 wherein said crop is at least partially threshed in said thresher assembly prior to being divided.

14. The method of claim 12 wherein each of said separator assemblies includes guide vanes and a rotor, said guide vanes and said rotor acting to move said crop rearwardly in said separator assemblies.

15. The method of claim 10 wherein said crop is partially threshed in said threshing assembly before being divided.

16. A method of threshing and separating crop material comprising the steps of receiving crop through an entrance area in the central portion of a large capacity rotary threshing assembly mounted substantially transversely to the longitudinal axis of a combine, said threshing assembly having a substantially cylindrical rotor operable to rotate about an axis transverse to said longitudinal axis, threshing said crop and dividing it by guide vanes located on the inside of said threshing assembly, conveying said crop outwardly from said central portion by said guide vanes while threshing said crop, passing said crop from exit areas located in each respective end portion of said threshing assembly to the entrance areas of two respective substantially parallel rotary separator assemblies, each separator assembly mounted substantially transversely to said threshing assembly and having entrance areas located adjacent said exit areas of said threshing assembly and separating said crop while conveying it rearwardly in said separating assemblies and discharging crop residue from said combine, whereby the separator assemblies can be made sufficiently long to accommodate the quantity of crop being threshed in said threshing assembly and the width and length of the combine can be kept to a minimum for a given capacity thresher.

* * * * *